United States Patent
Ballagas et al.

(10) Patent No.: US 12,494,293 B2
(45) Date of Patent: Dec. 9, 2025

(54) CONVEYING AGGREGATE PSYCHOLOGICAL STATES OF MULTIPLE INDIVIDUALS

(71) Applicant: Hewlett-Packard Development Company, L.P., Spring, TX (US)

(72) Inventors: Rafael Ballagas, Palo Alto, CA (US); Erika Siegel, Palo Alto, CA (US); Hiroshi Horii, Palo Alto, CA (US); Alexandre Santos Da Silva, Jr., Porto Alegre (BR); Jishang Wei, Guilford, CT (US); Jose Dirceu Grundler Ramos, Porto Alegre (BR); Rafael Dal Zotto, Spring, TX (US); Gabriel Lando, Porto Alegre (BR); Srikanth Kuthuru, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 80 days.

(21) Appl. No.: 18/249,109

(22) PCT Filed: Oct. 20, 2020

(86) PCT No.: PCT/US2020/056478
§ 371 (c)(1),
(2) Date: Apr. 14, 2023

(87) PCT Pub. No.: WO2022/086504
PCT Pub. Date: Apr. 28, 2022

(65) Prior Publication Data
US 2023/0402191 A1 Dec. 14, 2023

(51) Int. Cl.
*G16H 50/70* (2018.01)
*G06F 16/9038* (2019.01)

(52) U.S. Cl.
CPC ........ *G16H 50/70* (2018.01); *G06F 16/9038* (2019.01)

(58) Field of Classification Search
CPC ............................ G16H 50/70; G06F 16/9038
See application file for complete search history.

(56) References Cited

U.S. PATENT DOCUMENTS 8,390,503 B2   3/2013  Shigei
8,522,779 B2 * 9/2013  Lee ..................... A61M 16/026
                                                                607/42

(Continued)

FOREIGN PATENT DOCUMENTS

WO    2014/085910 A1    6/2014

OTHER PUBLICATIONS

Birek, Elsevier, 2018, pp. 226-240.*

*Primary Examiner* — Michael I Ezewoko
(74) *Attorney, Agent, or Firm* — Quarles & Brady LLP (57) ABSTRACT

Examples are described herein for determining aggregate psychological states of multiple individuals. In various examples, sensor data indicative of affects of multiple individuals may be analyzed. Based on the analyzing, the multiple individuals may be partitioned into multiple distinct clusters of individuals. An aggregate psychological state of the individuals of a given cluster of the multiple distinct clusters of individuals may be determined. Data indicative of the aggregate psychological state may be transmitted to cause a computing device to render output that conveys the aggregate psychological state of the individuals of the cluster.

17 Claims, 9 Drawing Sheets

(56) References Cited

U.S. PATENT DOCUMENTS

| | | | | |
|---|---|---|---|---|
| 8,600,120 | B2* | 12/2013 | Gonion | G06F 3/0485 |
| | | | | 382/209 |
| 8,640,021 | B2* | 1/2014 | Perez | H04N 21/4661 |
| | | | | 715/203 |
| 8,712,945 | B2* | 4/2014 | Baughman | G06Q 10/06 |
| | | | | 706/45 |
| 8,909,370 | B2 | 12/2014 | Stiehl et al. | |
| 9,113,032 | B1* | 8/2015 | Vander Mey | H04N 7/15 |
| 9,113,035 | B2* | 8/2015 | Bank | H04L 12/18 |
| 9,426,421 | B2* | 8/2016 | Balasaygun | H04L 12/1813 |
| 9,430,741 | B2* | 8/2016 | Baughman | G06N 5/047 |
| 9,898,511 | B2* | 2/2018 | Delaney | G06F 16/335 |
| 10,304,003 | B2* | 5/2019 | Baughman | G06N 20/00 |
| 10,346,539 | B2 | 7/2019 | Cecchi et al. | |
| 10,382,722 | B1* | 8/2019 | Peters | H04N 7/152 |
| 10,692,605 | B2* | 6/2020 | Chatterjee | G06N 5/00 |
| 10,757,367 | B1* | 8/2020 | Peters | H04N 7/152 |
| 10,810,896 | B2* | 10/2020 | Lawrenson | G09B 5/02 |
| 10,911,829 | B2* | 2/2021 | el Kaliouby | A61B 5/0077 |
| 10,950,254 | B2* | 3/2021 | Vaughn | G10L 15/30 |
| 11,122,240 | B2* | 9/2021 | Peters | G06V 20/41 |
| 11,165,991 | B2* | 11/2021 | Peters | G06V 20/41 |
| 11,217,226 | B2* | 1/2022 | Beaver | G10L 15/18 |
| 11,290,686 | B2* | 3/2022 | Peters | H04N 7/147 |
| 11,430,561 | B2* | 8/2022 | el Kaliouby | G06F 18/2413 |
| 11,785,180 | B2* | 10/2023 | Peters | H04N 7/147 |
| | | | | 348/14.09 |
| 12,061,671 | B2* | 8/2024 | Guo | G06N 3/084 |
| 2007/0263824 | A1* | 11/2007 | Bangalore | H04L 12/1827 |
| | | | | 379/202.01 |
| 2009/0164443 | A1* | 6/2009 | Ramos | G06F 16/21 |
| | | | | 707/999.005 |
| 2011/0301433 | A1* | 12/2011 | Sadowsky | G16H 20/70 |
| | | | | 600/300 |
| 2012/0038550 | A1* | 2/2012 | Lemmey | A63F 13/42 |
| | | | | 345/156 |
| 2012/0083675 | A1* | 4/2012 | el Kaliouby | A61B 5/165 |
| | | | | 600/301 |
| 2013/0018921 | A1* | 1/2013 | Jin | G06F 21/62 |
| | | | | 707/E17.001 |
| 2013/0198122 | A1* | 8/2013 | Baughman | G06N 5/047 |
| | | | | 706/45 |
| 2014/0108310 | A1* | 4/2014 | Baughman | G06N 20/00 |
| | | | | 706/12 |
| 2014/0172910 | A1* | 6/2014 | Jung | G06F 16/68 |
| | | | | 707/769 |
| 2014/0258393 | A1* | 9/2014 | Bank | G06Q 10/06 |
| | | | | 709/204 |
| 2016/0063235 | A1* | 3/2016 | Tussy | G06Q 20/3276 |
| | | | | 726/6 |
| 2016/0073054 | A1* | 3/2016 | Balasaygun | H04L 12/1822 |
| | | | | 348/14.08 |
| 2016/0104486 | A1* | 4/2016 | Penilla | H04L 67/1097 |
| | | | | 704/232 |
| 2016/0170996 | A1 | 6/2016 | Frank et al. | |
| 2016/0217137 | A1* | 7/2016 | Delaney | H04L 67/306 |
| 2016/0307111 | A1* | 10/2016 | Baughman | G06N 20/00 |
| 2016/0314416 | A1* | 10/2016 | Guven | G06Q 10/0635 |
| 2017/0003784 | A1* | 1/2017 | Garg | A63F 13/87 |
| 2017/0069124 | A1 | 3/2017 | Tong et al. | |
| 2017/0095192 | A1* | 4/2017 | Sadowsky | A61B 5/0205 |
| 2017/0105668 | A1* | 4/2017 | el Kaliouby | G16H 30/40 |
| 2017/0316707 | A1* | 11/2017 | Lawrenson | A61B 5/16 |
| 2018/0039905 | A1* | 2/2018 | Anghel | G06N 20/00 |
| 2018/0050696 | A1* | 2/2018 | Misu | A61B 5/6893 |
| 2018/0196432 | A1* | 7/2018 | Krupat | A61B 5/6893 |
| 2018/0251122 | A1* | 9/2018 | Golston | B60W 40/08 |
| 2019/0073547 | A1* | 3/2019 | el Kaliouby | G06N 3/084 |
| 2019/0135325 | A1* | 5/2019 | Lisseman | G06V 20/59 |
| 2019/0268660 | A1* | 8/2019 | el Kaliouby | G06V 10/764 |
| 2019/0320144 | A1 | 10/2019 | Tong et al. | |
| 2020/0130528 | A1* | 4/2020 | You | B60L 53/305 |
| 2020/0135225 | A1* | 4/2020 | Vaughn | H04N 21/25891 |
| 2020/0171977 | A1* | 6/2020 | Jales Costa | B60N 2/002 |
| 2020/0195887 | A1 | 6/2020 | Van Os et al. | |
| 2020/0223362 | A1* | 7/2020 | Witte | H04N 23/54 |
| 2020/0285871 | A1* | 9/2020 | Tokizaki | B60R 21/013 |
| 2020/0342979 | A1* | 10/2020 | Sadowsky | A61B 5/165 |
| 2020/0350057 | A1* | 11/2020 | el Kaliouby | G16H 40/67 |
| 2021/0176429 | A1* | 6/2021 | Peters | G06V 20/41 |
| 2022/0067816 | A1* | 3/2022 | Miyassi | G06Q 30/02 |
| 2023/0071645 | A1* | 3/2023 | VanLandeghem | G06N 20/00 |
| 2023/0410674 | A1* | 12/2023 | Lawrenson | G06F 3/013 |

* cited by examiner

CONVEYING AGGREGATE PSYCHOLOGICAL STATES OF MULTIPLE INDIVIDUALS

BACKGROUND

An individual's affect or affectual state is a set of observable manifestations of an emotion or cognitive state experienced by the individual. An individual's affectual state can be sensed by others, who may have learned, e.g., through lifetimes of human interactions, to infer an emotional or cognitive state (either constituting a "psychological state") of the individual. Put another way, individuals are able to convey their emotional and/or cognitive state through various different verbal and non-verbal cues, such as facial expressions, voice characteristics (e.g., pitch, intonation, and/or cadence), and bodily posture, to name a few.

BRIEF DESCRIPTION OF THE DRAWINGS

Features of the present disclosure are illustrated by way of example and not limited in the following figure(s), in which like numerals indicate like elements.

DETAILED DESCRIPTION

Psychological states of individuals may be inferred based on affectual data captured by sensor(s) for a variety of different applications. For example, participant(s) of a video conference may be provided with output that conveys inferred psychological states of other participants. As another example, a presenter to a virtual and/or in-person audience may receive notifications of inferred psychological states of the audience members, e.g., to help the presenter "read the room."

These notifications of inferred psychological states may be received using a variety of different output modalities, such as visual output on a display, audio output at a speaker/headset, haptic feedback using a piezoelectric actuator, etc. However, these notifications may be distracting or otherwise bothersome if not conveyed in a thoughtful manner. Moreover, each output modality may have limited information throughput. In the case of visual notifications, displays such as computer monitors or extended reality (e.g., virtual reality and/or augmented reality) displays have limited space (sometimes referred to as display "real estate") in which to convey information.

Video conference clients in particular may already be expected to present a lot of information on a display's limited space. Each participant may be presented with a live video stream of other participants, which can take up a lot of display space if there are numerous participants. Additionally, one participant may present the content of their display to other participants, further straining the display area. Moreover, many video conference clients also include other content, such as areas for textual chat and controls to toggle microphones and/or video cameras on and/or off, to name a few. Thus, displaying visual notifications of inferred psychological states of individual participants of a video conference may inundate, distract, or otherwise annoy a viewer.

Examples are described herein for efficiently conveying aggregate psychological states of multiple individuals. Doing so may, for instance, conserve resources associated with various output modalities. In various examples, sensor data indicative of measured affectual states of multiple individuals may be captured, e.g., by cameras and/or microphones onboard computing device(s) operated by or near those individuals. This sensor data may be analyzed to partition the individuals into multiple distinct clusters. Each cluster may include individuals having similar affects, and hence, similar inferred psychological states.

For each cluster, an aggregate psychological state of all of the individuals in the cluster may be determined, e.g., by analyzing affectual statistics associated with each individual in the cluster. An aggregate psychological state determined for a cluster of individuals may be used to generate output that conveys the aggregate psychological state, e.g., instead of conveying an individual psychological state for each individual of the cluster. Consequently, less output is used, and the output modality used to convey the output is less burdened.

In some examples, the output conveying the aggregate psychological state of a given cluster of individuals may take the form of an avatar that is rendered in a manner that exhibits observable manifestations of the aggregate psychological state. For example a face, bust, or entire body may be rendered and, in many examples, animated to reflect the current aggregate psychological state of the cluster of individuals. If the individuals of the cluster have an aggregate psychological state of happy, the avatar may, for instance, be rendered with a smile and with eyes that look outward so as to "make eye contact" with the individual looking at the display on which the avatar is rendered. If the individuals of the cluster have an aggregate psychological state of bored or inattentive, the avatar may be rendered without a smile, and the avatar's eyes may be rendered as looking elsewhere to indicate that they may not be paying attention. In some examples, output indicative of an aggregate psychological state may be conditionally rendered when certain criteria are met. For example, in some implementations, output indicative of an aggregate psychological state for a cluster of individuals may be rendered in response to the aggregate psychological state satisfying a threshold along, for instance, an arousal or valence axis.

In various examples, multiple outputs indicative of multiple aggregate psychological states may be conveyed simultaneously. For example, in a video conference with numerous participants, on a given participant's display, one avatar corresponding to one cluster of the participants may be rendered at one position on the display, another avatar corresponding to another cluster of the participants may be rendered at another position on the display, and so forth.

In some examples, the output rendered for a cluster of individuals may be visually emphasized, arranged, and/or annotated in order to convey information in addition to the cluster's aggregate psychological state. For example, the size and/or position of multiple avatars rendered at the same time may be selected based on counts of individuals in the multiple distinct clusters, relative locations of the aggregate psychological states of multiple distinct clusters relative to axes in continuous space (e.g., valence and arousal), magnitudes of the aggregate psychological states, and/or a percentage of a total population of individuals that are assigned to each cluster, to name a few.

Aggregate psychological states of clusters may be determined in various ways by various components. In some examples, each endpoint (e.g., personal computing device) may capture and locally analyze affectual data to determine, for instance, an individual's psychological state, an embedding that encodes the effectual data in a continuous space, affectual statistics for the individual, etc. Data indicative of individual psychological states gathered at these endpoints may then be collected and analyzed at a central computing system (e.g., multiple computing devices forming what is sometimes referred to as a "the cloud") in order to determine an aggregate psychological state.

In some examples, aggregate psychological state(s) determined at the cloud may be made available to others, e.g., via an application programming interface (API), remote procedure call (RPC), etc. Applications such as video conference clients, speaker presentation clients, etc., may obtain these aggregate psychological states from the cloud and may use them to render their own customized outputs (e.g., customized avatars). In other implementations, the cloud may generate outputs and transmit information indicative of those outputs to remote computing devices.

Figure 1:
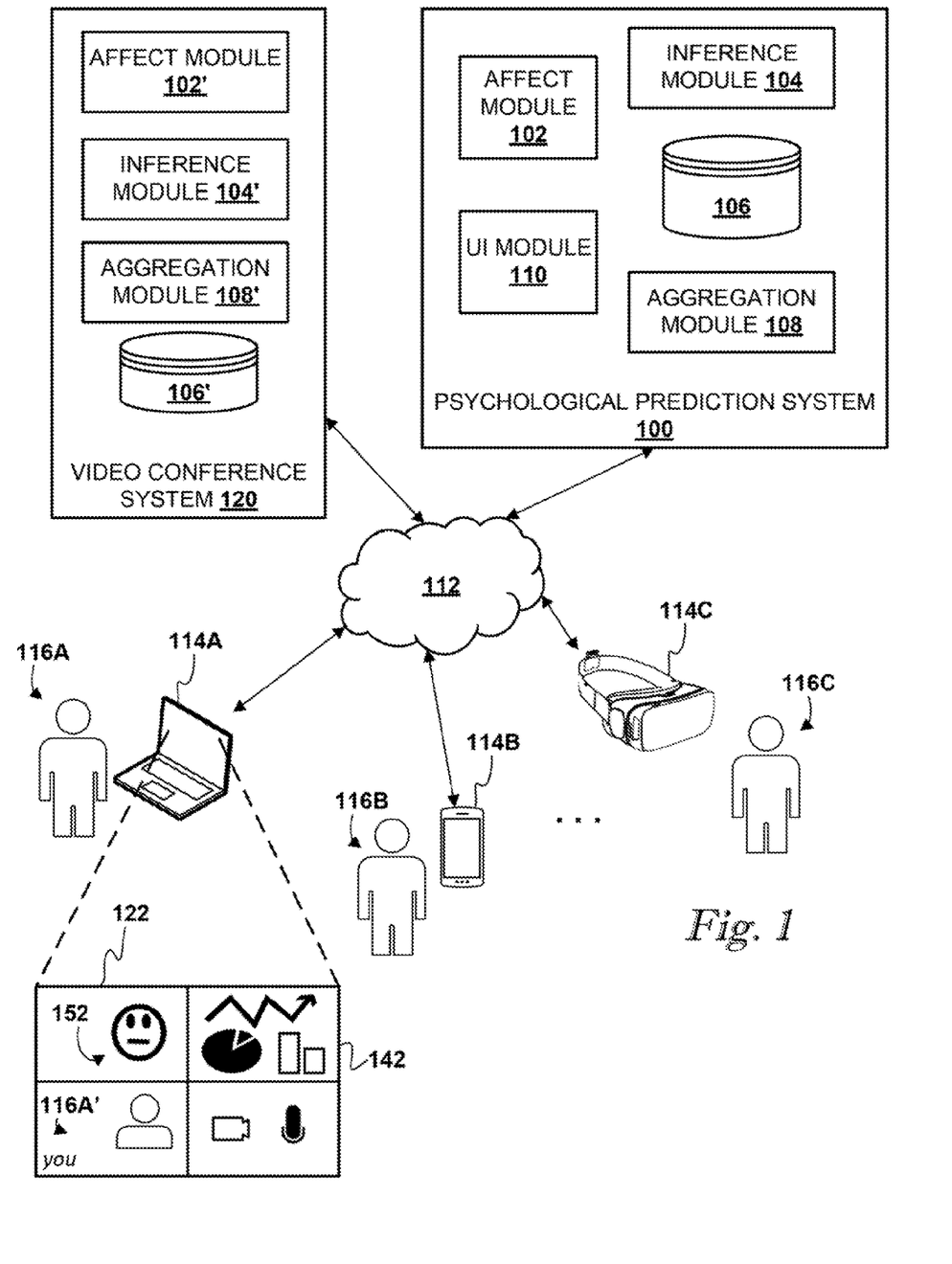
FIG. 1 schematically depicts an example environment in which selected aspects of the present disclosure may be implemented.

FIG. 1 schematically depicts an example environment in which selected aspects of the present disclosure may be implemented. A psychological prediction system 100 may include various components that, alone or in combination, perform selected aspects of the present disclosure to facilitate inference of psychological states. Each of these components may be implemented using any combination of hardware and computer-readable instructions. In some examples, psychological prediction system 100 may be implemented across computing systems that collectively may be referred to as the "cloud."

An affect module 102 may obtain and/or receive biometric data and/or other affectual data indicative of an individual's affectual state from a variety of different sources. As noted previously, an individual's affect is a set of observable manifestations of an emotion or cognitive state experienced by the individual. Individuals are able to convey their emotional and/or cognitive state through various different verbal and non-verbal cues, such as facial expressions, voice characteristics (e.g., pitch, intonation, and/or cadence), and bodily posture, to name a few. These cues may be detected using various types of sensors, such as microphones, vision sensors (e.g., 2D RGB digital cameras integral with or connected to personal computing devices), infrared sensors, physiological sensors (e.g., to detect heartrate, blood oxygen levels, temperatures, sweat level, etc.), and so forth.

The affectual data obtained/received by affect module 102 may be processed, e.g., by an inference module 104, based on various regression and/or machine learning models that are stored in a model index 106. The output generated by inference module 104 based on these affectual data may include and/or be indicative of the individual's psychological state, which can be an emotional state and/or a cognitive state.

Psychological prediction system 100 also includes an aggregation module 108 and a user interface (UI) module 110. Aggregation module 108 may determine aggregate psychological states of multiple individuals based on a variety of different signals. In some examples, aggregation module 108 may partition multiple individuals into multiple distinct clusters of individuals that likely have similar psychological states, e.g., based on psychological inferences determined by inference module 104 based on affectual data gathered or otherwise obtained by affect module 102. Aggregation module 108 may then determine (e.g., infer, assemble, calculate) an aggregate psychological state for each distinct cluster of individuals.

Various types of model(s) may be stored in index 106 and used, e.g., by inference module 104, to infer psychological states of individuals. Regressive models may be employed in some examples, and may include, for instance, linear regression models, logistic regression models, polynomial regression models, stepwise regression models, ridge regression models, lasso regression models, and/or ElasticNet regression models, to name a few. Other types of models may be employed in other examples. These other models may include, but are not limited to, support vector machines, Bayesian networks, decision trees, various types of neural networks (e.g., convolutional neural networks, feed-forward neural networks, various types of recurrent neural networks, transformer networks), random forests, and so forth. Regression models and machine learning models are not mutually exclusive. In some examples, a multi-layer perceptron (MLP) regression model may be used, and may take the form of a feed-forward neural network.

Psychological prediction system 100 may be in network communication with a variety of different data processing devices over computing network(s) 112. Computing network(s) 112 may include, for instance, a local area network (LAN) and/or a wide area network (WAN) such as the Internet. For example, in FIG. 1, psychological prediction system 100 is in network communication with three personal computing devices 114A-C operated, respectively, by three individuals 116A-C.

In this example, first personal computing device 114A takes the form of a laptop computer, second personal computing device 114B takes the form of a smart phone, and third personal computing device 114C takes the form of a head-mounted display that is equipped to provide an extended reality (e.g., virtual and/or augmented reality) user experience. However, the types and form factors of computing devices that allow individuals (e.g., 116A-C) to take advantage of techniques described herein are not so limited.

While not shown in FIG. 1, personal computing devices 114A-C may be equipped with various sensors (e.g., cameras, microphones, other biometric sensors) mentioned previously that can capture different types of affectual data from individuals 116A-C. While three individuals 116A-C and three personal computing devices 114A-C are depicted in FIG. 1, as indicated by the ellipses, aggregate psychological states may be determined for any number of individuals operating any number of personal computing devices. Moreover, it may not always be the case that each individual operate his or her own personal computing device. There may be many instances in which a single computing device obtains sensor data that captures affects of multiple individuals, e.g., of an audience.

In the example of FIG. 1, individuals 116A-C are using their respective personal computing devices 114A-C to participate in a video conference. The video conference is facilitated by a video conference system 120. However, techniques described herein for determining aggregate psychological states are not limited to video conferences, and the example of FIG. 1 is included simply for illustrative purposes. Aggregate psychological states determined using techniques described herein may be applicable in a wide variety of circumstances. Some examples include allowing a speaker of a presentation (e.g., a teacher in a virtual classroom) or a moderator of a test audience to gauge the attentiveness and/or interest of audience members. Other examples may include, for instance, consumer product testing, e.g., to allow a consumer test administrator to obtain real-time updates that summarize multiple testers' current attitude towards a product they are testing. Yet other examples may include audience engagement analysis for live television and/or streaming video broadcasts.

Individuals 116A-C may communicate with each other as part of a video conference facilitated by video conference system 120 (and in this context may be referred to as "participants"). In some configurations, each individual 116 may see graphical representations of other individuals (participants) participating in the video conference, such as avatars and/or live streams. However, there may be numerous participants in the video conference, making it difficult to fit graphical representations of all participants on a single screen. It may be possible to render multiple screens' worth of graphical representations of participants, with each participant being able to scroll between screens of other participants. However, this can become ungainly as more participants join the call.

Accordingly, in various examples, a given video conference participants may see output that conveys aggregate psychological states of clusters of individuals, rather than (or in addition to) psychological states inferred for individual participants. An example of this is shown in the called-out window 122 at bottom left, which demonstrates what first individual 116A might see while participating in a video conference with individuals 116B, 116C, and other participants not depicted in FIG. 1. First individual's own graphical representation 116A' is presented at bottom left. Controls for toggling a camera and/or microphone on/off are shown at bottom right. And a presentation 142 currently being shown to multiple participants in the video conference is shown at top right.

First individual 116A may be, for instance, a presenter of presentation 142, and may wish to be kept apprised of psychological states of the audience, i.e., other participants in the video conference. At top left, an avatar 152 is rendered to represent the aggregate psychological state of a plurality of other participants in the video conference, such as all other participants or some selected subset of the participants. Avatar 152 currently appears attentive, if not necessarily enthusiastic, which conveys that, in the aggregate, other participants in the video conference appear to be mostly paying attention.

UI module 110 of psychological prediction system 100 may provide an interface that allows users (e.g., individuals 116A-C) to interact with psychological prediction system 100 for various purposes. In some examples, this interface may be an application programming interface (API). In other examples, UI module 110 may generate and publish markup language documents written in various markup languages, such as the hypertext markup language (HTML) and/or the extensible markup language (XML). These markup language documents may be rendered, e.g., by a web browser of a personal computing device (e.g., 116A-C), to facilitate interaction with psychological prediction system 100.

Psychological prediction system 100 does not necessarily determine every individual and/or aggregate psychological inference locally. In some examples, psychological prediction system 100 may generate, update, and/or generally maintain various models in index 106. The models in index may then be made available to others, e.g., over network(s) 112.

For example, in FIG. 1, video conference system 120 includes its own local affect module 102', local inference module 104', local model index 106', and local aggregation module 108'. Local affect module 102' may receive various affectual data from sensors integral with or otherwise in communication with personal computing devices 114A-C, similar to remote affect module 102 of psychological prediction system 100. Local inference module 104' may, e.g., periodically and/or on demand, obtain updated models from psychological prediction system 100 and store them in local model index 106'. Local inference module 104' may then use these models to process affectual data obtained by local affect module 102' to make inferences about video conference participants' psychological states. Local aggregation module 108' may aggregate data indicative of these inferences, or may aggregate affectual data gathered by local affect module 102' (in some cases bypassing inference module 102), and may determine aggregate psychological states of multiple individuals.

Figure 2A:
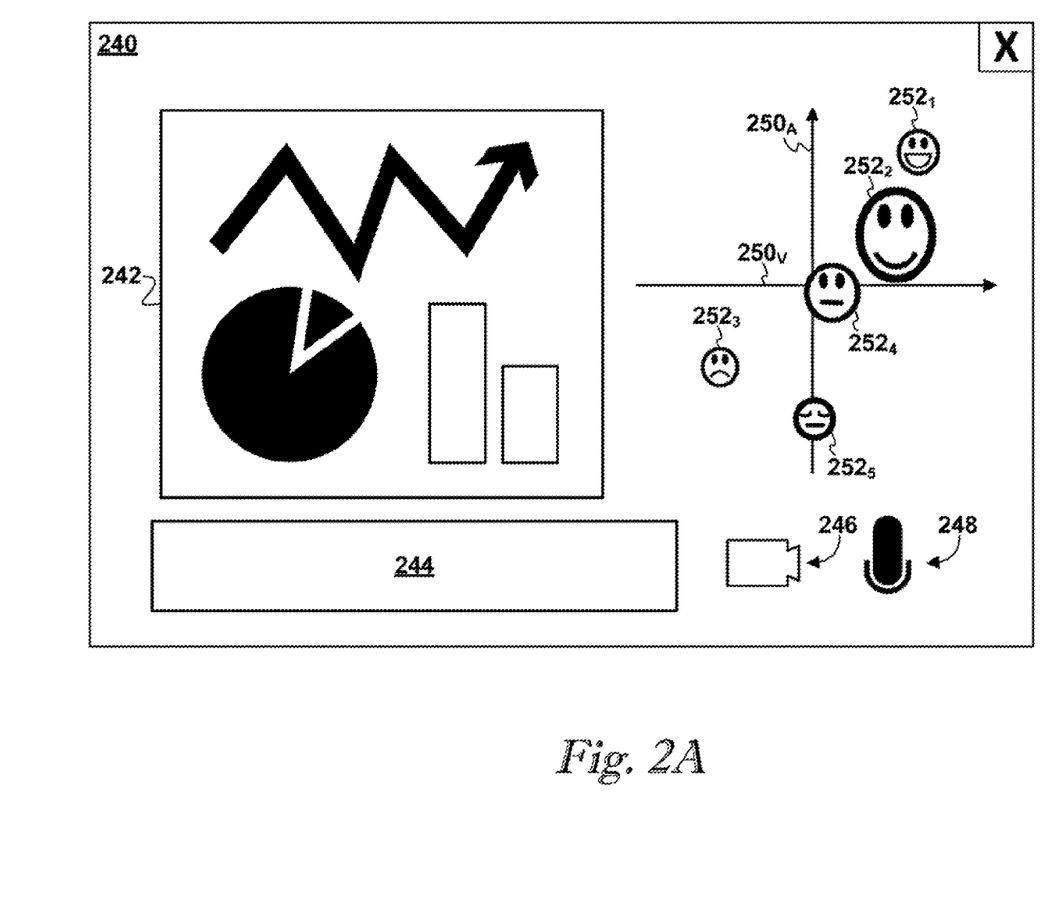
FIGS. 2A, 2B, and 2C demonstrate an example of how aggregate psychological states determined using techniques described herein may be presented, in accordance with various examples.
Figure 2B:
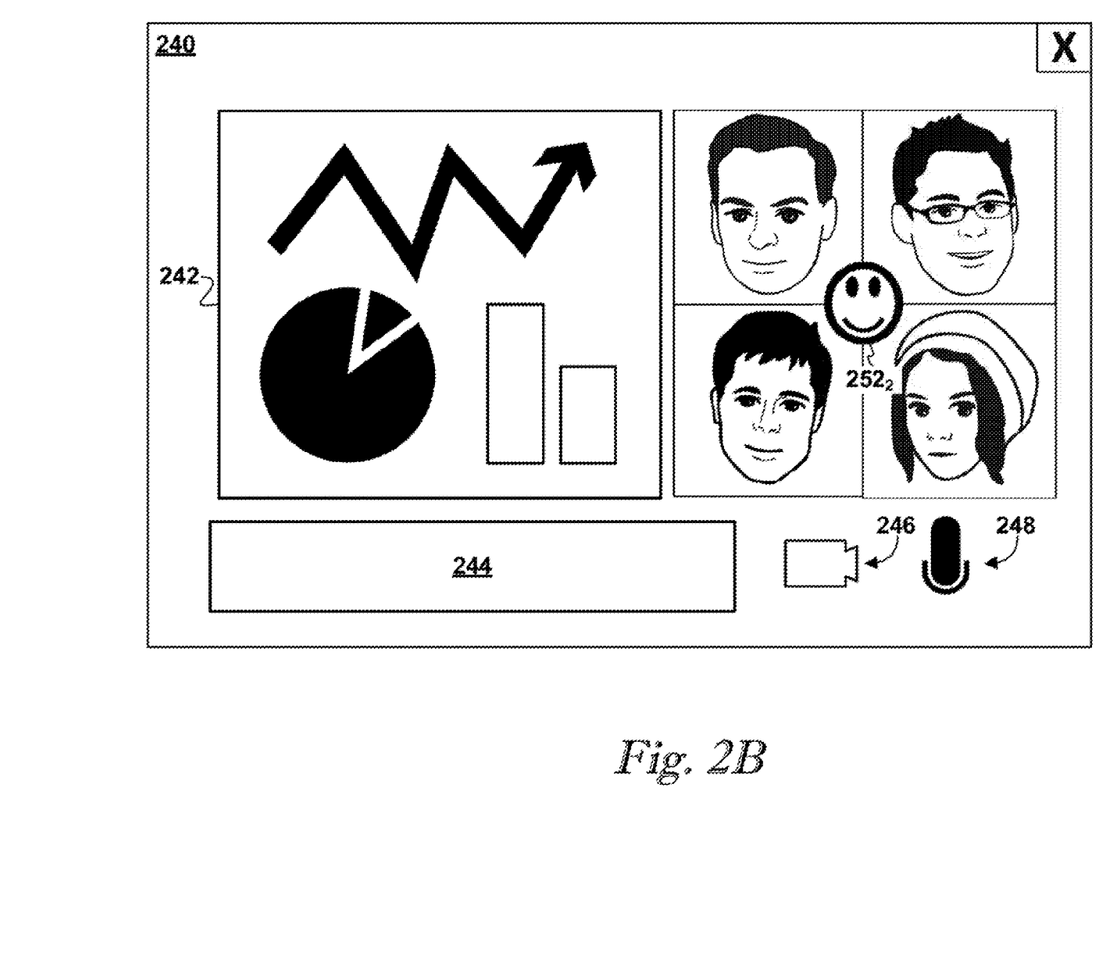
Figure 2C:
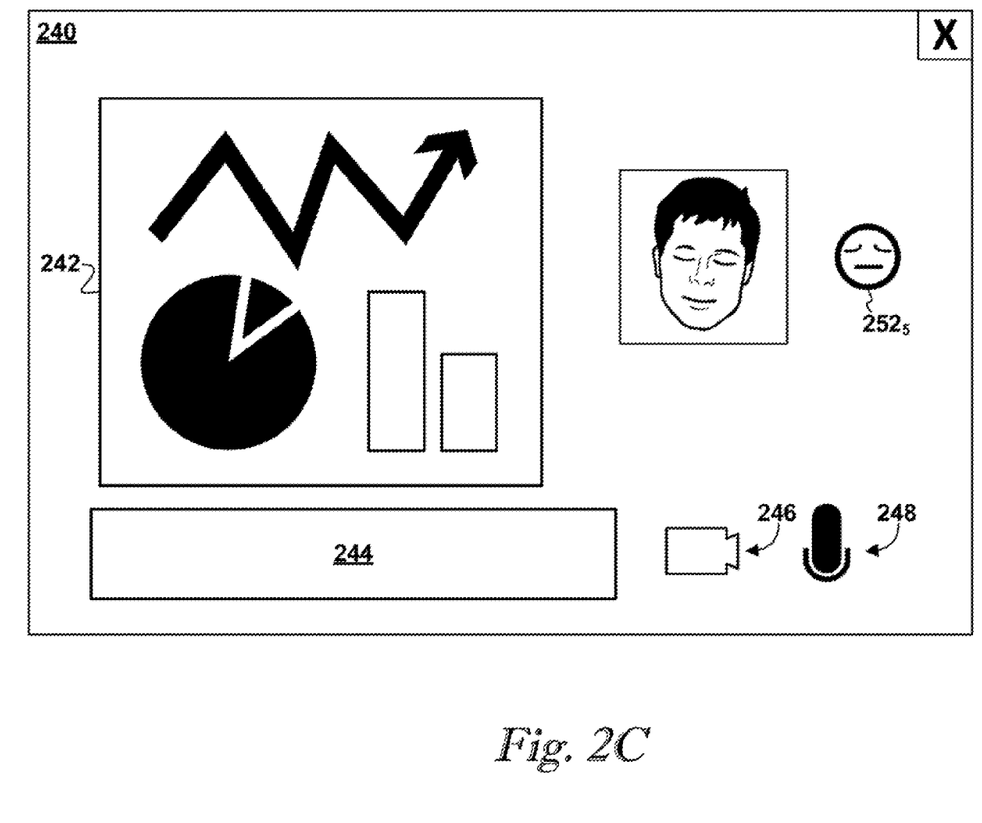

FIGS. 2A, 2B, and 2C demonstrate an example of how aggregate psychological states determined using techniques described herein may be presented, in accordance with various examples. In some examples, a GUI 240 may present an interface that visually resembles FIGS. 2A-C, and that allows a user such as a video conference participant to see aggregate psychological states of clusters of other participants of the video conference.

In FIG. 2A, GUI 240 includes a presentation 242 (similar to presentation 142 in FIG. 1), an area 244 for textual chatting, a camera control 246 to toggle a camera (e.g., a webcam) on/off, and a microphone control 248 to toggle a microphone between a muted and non-muted state. GUI 240 also includes, in the upper right portion, an area that includes multiple axes that represent different psychological scales or ranges. In FIG. 2A, a vertical axis $250_A$ represents arousal and a horizontal axis $250_V$ represents valance. However, more or less axes may be used, and may be arranged differently than is shown in FIG. 2A.

A plurality of avatars $252_{1-5}$ are arranged at various locations and sizes relative to axes $250_A$ and $250_V$. Each avatar 252 of the plurality represents either an aggregate psychological state of multiple individuals, or in some cases may represent the psychological state of a single individual where that single individual is a psychological outlier from other individuals, and therefore cannot be easily clustered together with other individuals.

Avatars $252_{1-5}$ are positioned relative to axes $250_A$, $250_V$ in order to convey the aggregate psychological states they are meant to convey. This arrangement may be helpful for users who are familiar with the arousal-valence circumplex. Avatars $252_{1-5}$ also are rendered as faces with expressions or other outward-facing manifestations that correspond to their underlying aggregate psychological states, e.g., for the benefit of users who are less familiar with the arousal-valence circumplex.

Thus, for instance, first avatar $252_1$ is rendered in the upper right quadrant to indicate high levels of both arousal and valence, as indicated by its almost gleeful expression. Second avatar $252_2$ is rendered somewhat lower on the arousal axis $250_A$, indicating general satisfaction if somewhat less enthusiasm than first avatar $252_1$. Third avatar $252_3$ is in stark contrast to first avatar $252_1$, deep in the lower left quadrant to indicate relative displeasure on the valence axis $250_V$ and relative disengagement on the arousal axis $250_A$. Fourth avatar $252_4$ is near the intersection of axes $250_A$ and $250_V$, indicating relatively neutral emotion and arousal. Fifth avatar $252_5$ is neutral on the valence axis $250_V$ and very low on the arousal axis $250_A$, and is rendered as being asleep.

Avatars $252_{1-5}$ are also sized to convey how many individuals they each represent. For example, second avatar $252_2$ is the largest and therefore conveys the aggregate psychological state of the largest cluster of individuals. By contrast, third avatar $252_3$ is much smaller, and therefore conveys an aggregate psychological state of a smaller cluster of individuals.

In some examples, avatars $252_{1-5}$ may be interactive graphical elements that can be interacted with (e.g., clicked, hovered over, swiped, etc.) to trigger various responsive actions. For example, if the user were to click on second avatar $252_2$, the user may be presented with an updated GUI 240 as shown in FIG. 2B. In FIG. 2B, graphical representations of four individuals that are part of the cluster of individuals underlying second avatar $252_2$ are rendered at top right. The rest of GUI 240 remains in a similar state as FIG. 2A. Thus, a user can click on any of avatars $252_{1-5}$ to see more detailed representations of those individuals.

Although not depicted in FIG. 2B, in some examples, each individual's psychological state—which may have been used with the psychological states of the other three individuals to determine the aggregate psychological state underlying second avatar $252_2$—may be presented alongside/underneath that individual, e.g., so that the user can get more details about how each individual is feeling/thinking. In some cases the user can drill down as far as individual people and their individual psychological states.

In some examples, individuals within the cluster may be further partitioned into sub-cluster(s) to convey more granular aggregate psychological states. Suppose the aggregate psychological state of a cluster of ten individuals is happy and attentive. When a user clicks on the avatar that conveys this aggregate psychological state, the user may be presented with ten graphical representations of those individuals. Six of those individuals may be further partitioned into one sub-cluster with its own sub-avatar, and the other four individuals may be further partitioned into another sub-cluster with its own sub-avatar. In some examples, the two sub-avatars and/or the affectual data underlying them may be interpolated into the aggregate psychological state and/or avatar that represents the whole larger cluster.

FIG. 2C depicts GUI 240 after the user clicks on a different avatar in FIG. 2A—namely, fifth avatar $252_5$. Once clicked, a graphical representation in the form of a live video stream is rendered for the individual(s) forming part of the cluster underlying fifth avatar $252_5$. In this case there is a single individual who appears to be asleep. In some examples, the user (or another user) may be able to cause various audio, visual, and/or haptic output to be rendered at a computing device controlled by this sleeping individual, e.g., to rouse them.

Figure 3:
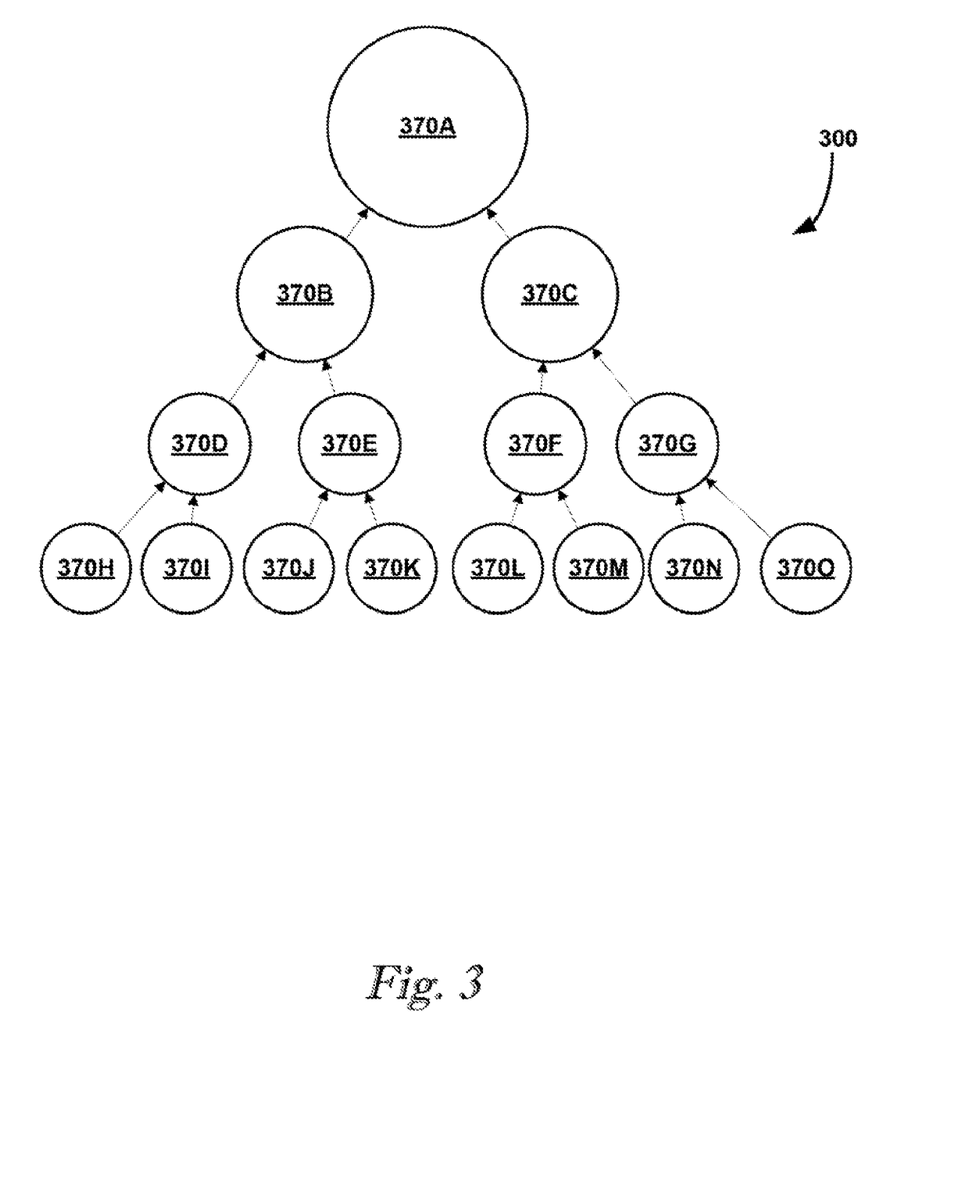
FIG. 3 depicts an example hierarchal clustering tree that demonstrates how individual psychological inferences may be aggregated into aggregate psychological states at various levels of granularity, in accordance with various examples.

FIG. 3 depicts an example hierarchal clustering tree 300 that demonstrates how individual psychological inferences may be aggregated into aggregate psychological states at various levels of granularity, in accordance with various examples. In some examples, tree 300 may be a binary tree, where each node either has zero or two children. In other examples, tree 300 may take the form of other types of trees or graphs.

Tree 300 includes a root node 370A and a plurality of children nodes 370B-370O. Leaf nodes 370H may each represent an individual's inferred psychological state determined, for instance, from sensor/affectual data obtained by a personal computing device (e.g., 114A-C in FIG. 1). Root node 370A may represent an aggregate psychological state of all the individuals represented by tree 300. In this example there are eight leaf nodes (370H-O) and so it will be assumed that there are eight individuals forming the whole group (e.g., participants in a video conference). However, any number of individuals may be considered as a group using techniques described herein.

In some examples in which psychological states are mapped to a continuous region similar to the arousal-valence space depicted in FIG. 2A, nodes of tree 300 may be split into different regions of that space. Thus, for instance, below root node 370A, child node 370B may represent arousal that is greater than zero and child node 370C may represent arousal that is less than zero. Other nodes may be split in similar manners. For example, child nodes 370D and 370F may represent valence that is greater than zero. Child nodes 370E and 370G may represent valence that is less than zero. Other types of splits are possible. For example, a node may be split into two (or more) child nodes based on engagement (e.g., positive valence and arousal) versus disengagement (e.g., negative valence and arousal). In some examples, end users may select how nodes (and hence, clusters) are split amongst different spaces in a psychological continuum.

In some examples, general similarity metrics such as Euclidean distance and/or clustering techniques such as K-means clustering may be employed to partition individuals into clusters of psychologically-similar individuals automatically. For example, agglomerative hierarchical clustering may be used to generate tree 300 in FIG. 3. At the start, each individual psychological state, e.g., represented as a coordinate along a valence-arousal continuum, may be considered as a separate cluster (e.g., leaf nodes 370H-O).

The two most similar psychological states may be merged into one cluster in a bottom-up fashion. This merging process may repeat until, for instance, one cluster remains to represent all emotions (e.g., root node 370A). The binary tree 300 that is generated during this clustering process may indicate which two clusters are merged at each iteration. In various examples, a user may have the option of selecting a number of clusters and/or levels of hierarchy that will be partitioned/generated.

In some examples, each node 370 in the binary tree 300 may be associated with a representative output, such as a representative emotion avatar. At the individual person level (e.g., leaf nodes 370H-O), the avatar for each leaf node may correspond to a predefined psychological state. In some examples, when two clusters are merged into one, the avatar for the new cluster may be based on an interpolation of the expression(s) of avatars from the merged child clusters. In other examples, the new avatar may be generated using a pre-trained avatar generative model. In some examples, avatars at each hierarchal level of tree 300 may be ordered by the number of distinct psychological states they represent. For example, node 370D may represent a relatively homogenous cluster of individuals with similar psychological states as each other, and therefore, a relatively low number of distinct psychological states. By contrast, node 370E may represent a relatively heterogeneous cluster of individuals with any number of distinct psychological states.

Data indicative of the affectual state of an individual—which as noted above may include sensor data that captures various characteristics of the individual's facial expression, body language, voice, etc.—may come in various forms and/or modalities. For example, affectual data for one individual may include vision data acquired by a camera that captures the individual's facial expression and bodily posture, but no audio data because the individual has muted his or her microphone. Affectual data for another individual may include vision data acquired by a camera that captures an individual's bodily posture and characteristics of the individual's voice contained in audio data captured by a microphone (which is not muted). Affectual data for yet another individual may include data acquired from sensors onboard an extended reality headset (augmented or virtual reality), or onboard wearables such as a wristwatch or smart jewelry.

In some examples, incongruent affectual datasets may be normalized into a form that is uniform, so that inference module 104 is able to process them using the same model(s) to make psychological inferences. For example, in some examples, multiple incongruent affectual datasets may be preprocessed to generate embeddings that are normalized or uniform (e.g., same dimension) across the incongruent datasets. These embeddings may then be processed by inference module 104 using model(s) stored in index 106 to infer psychological states.

Figure 4:
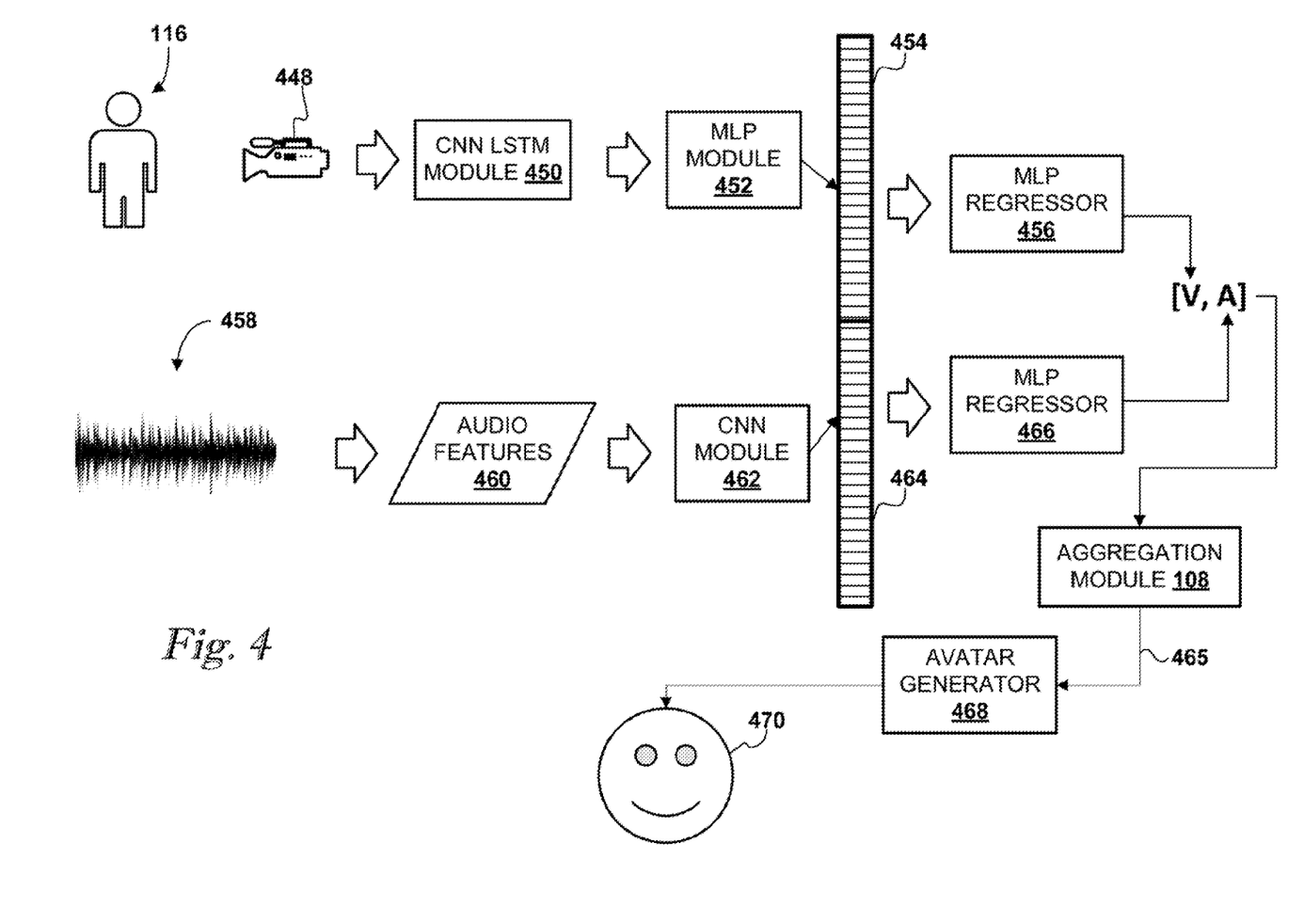
FIG. 4 schematically depicts an example architecture for preprocessing data in accordance with aspects of the disclosure.

FIG. 4 schematically depicts an example architecture for preprocessing data in accordance with aspects of the disclosure. Numerous other architectures are contemplated, and the example of FIG. 4 is for illustrative purposes. Various features of an affectual state of an individual 116 are captured by a camera 448. These features may be processed using a convolutional long short-term memory neural network (CNN LSTM) 450. Output of CNN LSTM 450 may be processed by a MLP module 452 to generate an image embedding 454.

Meanwhile, audio data 458 (e.g., a digital recording) of the individual's voice may be captured by a microphone (not depicted). Audio features 460 may be extracted from audio data 458 and processed using a CNN module 462 to generate an audio embedding 464. In some examples, visual embedding 454 and audio embedding 464 may be combined, e.g., concatenated, as a single, multi-modal embedding 454/464.

This single, multi-modal embedding 454/464 may then be processed by multiple MLP regressor models 456, 466, which may be stored in model index 106. As noted previously, regression models are not limited to MLP regressor models. Each MLP regressor model 456, 466 may generate a different numerical value, and these numerical values may collectively form a coordinate in continuous space. In FIG. 4, for instance, MLP regressor model 456 generates the valence value along the valence axis $250_V$ in FIG. 2A. MLP regressor model 466 generates the arousal value along the arousal axis $250_A$ in FIG. 2A.

These valence-arousal coordinates may then be provided, e.g., along with valence-arousal coordinates of some number of other individuals, to aggregation module 108. As described previously, aggregation module 108 may partition individuals into clusters of individuals having similar psychological states. Aggregation module 108 may then pass data 465 indicative of an aggregate psychological state of a cluster of individuals to an avatar generator 468. In some examples, data 465 indicative of the aggregate psychological state may be, for instance, an aggregate valence-arousal coordinate (e.g., a centroid or mean of the cluster). In other example, data 465 may simply convey an aggregate psychological state.

Based on data 465, avatar generator 468 may generate an avatar 470 that conveys the aggregate psychological state. In some examples, avatar generator 468 may be part of a separate system and/or ecosystem than many of the other components of FIG. 4. For example, avatar generator 468 may connect to an API that gives it access to the data 465 generated and/or provided by aggregation module 108.

The architecture of FIG. 4 may be used to process multi-modal effectual data that includes both visual data captured by camera 448 and audio data 458. Other affectual datasets having different modalities may be processed using different architectures to generate embeddings that are similar to combined embedding 454/464, and/or that are compatible with MLP regressor models 456, 466.

Figure 5:
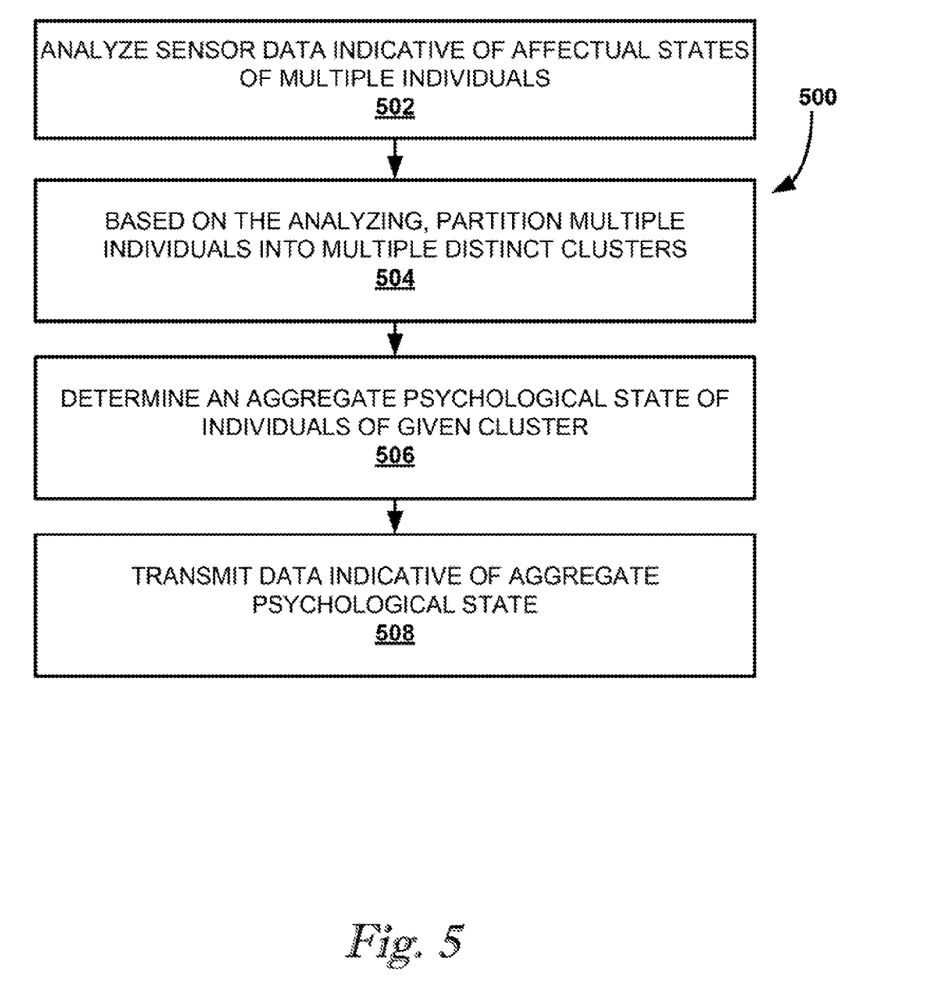
FIG. 5 depicts an example method for determining aggregate psychological states, in accordance with various examples.

FIG. 5 depicts an example method 500 for determining aggregate psychological states, in accordance with various examples. For convenience, the operations of method 500 will be described as being performed by a system, which may include, for instance, psychological prediction system 100. The operations of method 500 may be reordered, and various operations may be added and/or omitted.

At block 502, the system may analyze sensor data indicative of affectual states of multiple individuals. For example, multiple personal computers (e.g., 114A-C) may capture effectual data from sensors such as cameras, microphones, physiological sensors (e.g., thermometers, heart rate monitors of smart watches, galvanic skin response monitors, respiratory rate monitors, sensors that detect pupil dilation, etc.) and provide this data to affect module 102. Affect module 102 may collect, preprocess where appropriate, and provide this data to inference module 104. Inference module 104 may analyze the data, e.g., by mapping it to a continuous space that is indexed on psychological states to determine individual psychological states of individuals. For example, the analyzing of block 502 may include processing sensor data indicative of an affectual state of each individual to determine a coordinate associated with the individual in a continuous space that is indexed by valence and arousal, as shown in FIGS. 2A and 4.

Based on the analyzing at block 502, at block 504, the system, e.g., by way of aggregation module 108, may partition the multiple individuals into multiple distinct clusters of individuals, with each cluster including individuals having similar psychological states. In some examples, the partitioning of block 504 may be based on distances between the individuals' coordinates in the continuous space. In some implementations, the partitioning of block 504 may include performance of agglomerative hierarchal clustering as shown in FIG. 3. The multiple distinct clusters may include a hierarchy of clusters such as that depicted at 300, with an aggregate psychological state being determined for each cluster of the hierarchy.

At block 506, the system, e.g., by way of aggregation module 108, may determine an aggregate psychological state of the individuals of a given cluster of the multiple distinct clusters of individuals. At block 508, the system, e.g., by way of aggregation module 108 and/or UI module 110, may transmit data indicative of the aggregate psychological state. In some examples, this data may be transmitted to a remote computing device/system, such as a personal computing device 114 and/or to video conference system 120. In other examples, the transmitting may occur locally, e.g., along a bus. In either case, the transmitting may cause a computing device (e.g., 114) to render output that conveys the aggregate psychological state of the individuals of the cluster. This output may take the form of an avatar (which may or may not be animated) that exhibits observable manifestations of the aggregate psychological state, textual output, a background color, a symbol, an avatar positioned and/or spaced along a continuum based on various signals, etc.

In some implementations, the transmitting of block 508 may cause the computing device to render multiple avatars, each avatar conveying an aggregate psychological state of the individuals in one of the multiple distinct clusters. In some such examples, the multiple avatars may be sized or positioned on the display based on: counts of individuals in the multiple distinct clusters; relative locations of the aggregate psychological states of the multiple distinct clusters relative to axes in continuous space; or magnitudes of the aggregate psychological states. In some implementations in which agglomerative hierarchal clustering is employed, an expression conveyed by an avatar rendered to convey the aggregate psychological state of a parent cluster may take the form of an interpolation of expressions conveyed by other avatars that convey aggregate psychological states of children clusters of the parent cluster.

Figure 6:
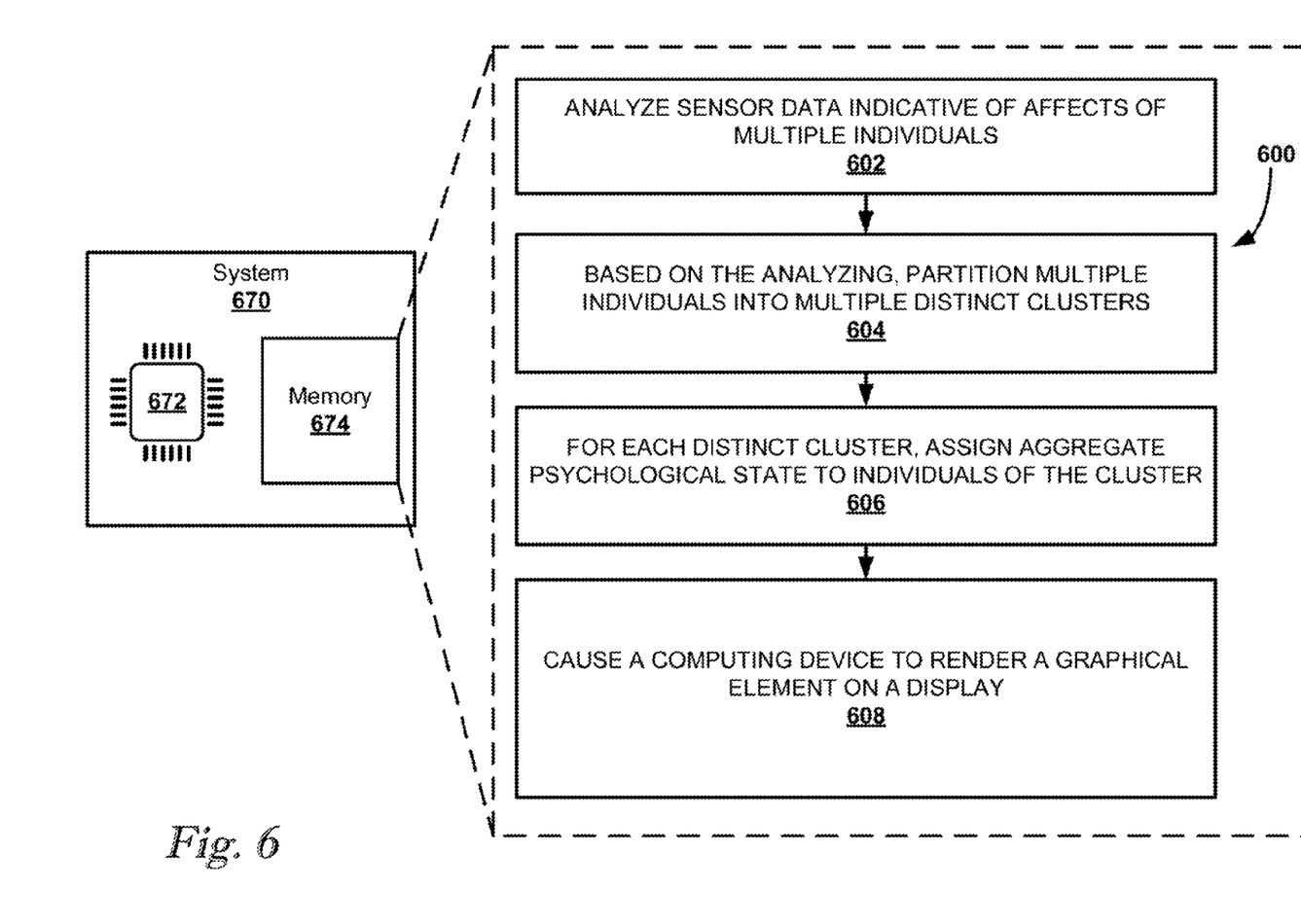
FIG. 6 shows a schematic representation of a system, according to an example of the present disclosure.

FIG. 6 shows a schematic representation of a system 670, according to an example of the present disclosure. System 670 includes a processor 672 and memory 674 that stores non-transitory computer-readable instructions 600 for performing aspects of the present disclosure, according to an example.

Instructions 602 cause processor 672 to analyze sensor data indicative of affectual states of multiple individuals. Based on the analyzing, instructions 604 cause processor 672 to partition the multiple individuals into multiple distinct clusters of individuals.

Instructions 606 cause processor 672 to, for each distinct cluster, assign an aggregate psychological state to the individuals of the cluster. Instructions 608 cause processor 672 to cause a computing device to render a graphical element on a display. In various implementations, the graphical element non-verbally conveys the aggregate psychological state of the individuals of one of the clusters, e.g., using an animated avatar.

Figure 7:
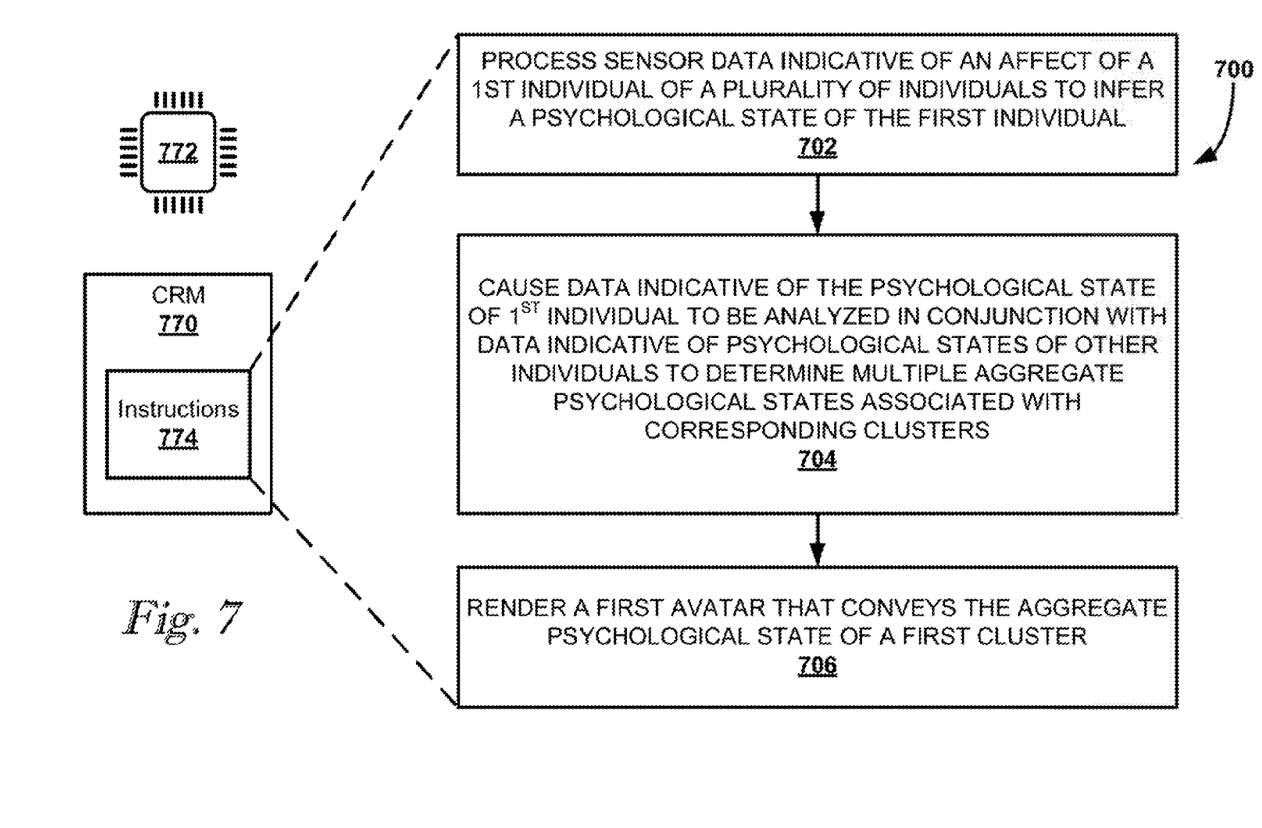
FIG. 7 shows a schematic representation of a non-transitory computer-readable medium, according to an example of the present disclosure.

FIG. 7 shows a schematic representation of a non-transitory corn outer-readable medium (CRM) 772, according to an example of the present disclosure. CRM 770 stores computer-readable instructions 774 that cause the method 700 to be carried out by a processor 772.

At block 702, processor 772 may process sensor data indicative of an affectual state of a first individual of a plurality of individuals to infer a psychological state of the first individual.

At block 704, processor 772 may cause the data indicative of the psychological state of the first individual to be analyzed in conjunction with data indicative of psychological states of other individuals of the plurality of individuals to determine multiple aggregate psychological states associated with corresponding clusters of individuals in the plurality individuals. For example, the individual's psychological state may be inferred locally at a personal computing device 114. Data indicative of that inferred psychological state may then be provided to psychological prediction system 100 for analysis with other individuals' psychological states. At block 706, processor 772 may render, on a display, a first avatar that conveys the aggregate psychological state of a first cluster of the clusters.

Although not shown in FIG. 7, in some examples, instructions 774 may include instructions to render, on the display, contemporaneously with rendition of the first avatar, a second avatar that conveys the aggregate psychological state of a second cluster of the clusters. The first and second avatars may be sized and/or positioned relative to each other based on: counts of individuals in the first and second clusters; relative locations of the aggregate psychological states of the first and second clusters relative to axes in continuous space; relative magnitudes of the aggregate psychological states of the first and second clusters; or a percentage of the plurality of individuals that are assigned to each of the first and second clusters.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method, comprising:
receiving first sensor data from a first sensor, the first sensor data being indicative of an affectual state of a first individual;
receiving second sensor data from a second sensor, the second sensor data being indicative of an affectual state of a second individual;
generating, by applying one or more machine learning models to the first and second sensor data, a multi-modal embedding;
generating, by applying one or more regressor models to the multi-modal embedding, valence-arousal coordinates for the first and second individuals;
partitioning, based on the valence-arousal coordinates, the first and second individuals into multiple distinct clusters of individuals;
determining an aggregate psychological state of the individuals of a given cluster of the multiple distinct clusters of individuals; and
transmitting, in response to determining the aggregate psychological state of the individuals of the given cluster, data indicative of the aggregate psychological state of the individuals.

2. The method of claim 1, further comprising:
triggering, in response to transmitting the data indicative of the aggregate psychological state of the individuals, a computing device to render one or more interactive graphical elements onto a display.

3. The method of claim 2, wherein a graphic user interface on the display comprises the one or more interactive graphical elements.

4. The method of claim 2, wherein the one of the interactive graphical elements is to convey a psychological state of the first individual.

5. The method of claim 2, wherein the one of the interactive graphical elements is to convey a psychological state of the second individual.

6. The method of claim 2, wherein the one or more interactive graphical elements exhibits observable manifestations of the aggregate psychological state.

7. The method of claim 2, wherein another of the interactive graphical elements is to convey the aggregate psychological state of the individuals of the given cluster.

8. The method of claim 1, wherein the valence-arousal coordinates are coordinates associated with the first and second individuals in a continuous space indexed by valence and arousal.

9. The method of claim 8, wherein partitioning is based on distances between the coordinates in the continuous space.

10. A non-transitory computer-readable medium comprising instructions that, in response to execution of the instructions by a processor, cause the processor to:
- apply, to sensor data indicative of an affectual state of a plurality of individuals, one or more machine learning models to the sensor data;
- infer, by applying the one or more machine learning models to the sensor data, a psychological state for the individual;
- generate, based on the inferred psychological state of the individual, multi-modal embedding;
- determine, based on the multi-modal embedding, multiple aggregate psychological states associated with corresponding clusters of individuals in the plurality individuals;
- convert, in response to combining the sensor data, the multi-modal embedding into one or more interactive graphical elements; and
- transmit, in response to converting the multi-modal embedding, data that causes a computing device to render the one or more interactive graphical elements on a display.

11. The non-transitory computer-readable medium of claim 10, wherein an avatar conveys the aggregate psychological state of one of the clusters.

12. The non-transitory computer-readable medium of claim 11, wherein the avatar conveys the aggregate psychological state of one of the clusters.

13. The non-transitory computer-readable medium of claim 11, further comprising non-transitory computer-readable medium comprising instructions that, in response to execution of the instructions by the processor, cause the processor to:
- render, on the display, contemporaneously with rendition of the avatar, an additional avatar that conveys the aggregate psychological state of another one of the clusters.

14. The non-transitory computer-readable medium of claim 13, wherein the avatar and the additional avatar are sized and positioned relative to each other based on counts of individuals in the clusters.

15. The non-transitory computer-readable medium of claim 13, wherein the avatar and the additional avatar are sized and positioned relative locations of the aggregate psychological states of the clusters relative to axes in continuous space.

16. The non-transitory computer-readable medium of claim 13, wherein the avatar and the additional avatar are sized and positioned relative magnitudes of the aggregate psychological states of the clusters.

17. The non-transitory computer-readable medium of claim 13, wherein the avatar and the additional avatar are sized and positioned relative to each other based on a percentage of the plurality of individuals that are assigned to each of the clusters.

* * * * *